(12) United States Patent
Xiong et al.

(10) Patent No.: US 10,211,766 B2
(45) Date of Patent: Feb. 19, 2019

(54) MULTI-TURN ANGLE CONTROLLING METHOD BASED ON AN ABSOLUTE POSITION ENCODER AND DEVICE

(71) Applicant: UBTECH Robotics Corp., Shenzhen (CN)

(72) Inventors: Youjun Xiong, Shenzhen (CN); Xi Bai, Shenzhen (CN); Wenhua Fan, Shenzhen (CN); Lifu Zhang, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 0 days.

(21) Appl. No.: 15/591,059

(22) Filed: May 9, 2017

(65) Prior Publication Data

US 2018/0188074 A1 Jul. 5, 2018

(30) Foreign Application Priority Data

Dec. 31, 2016 (CN) .......................... 2016 1 1266118

(51) Int. Cl.
    *G01D 5/12* (2006.01)
    *H02P 7/00* (2016.01)
    *H02P 6/20* (2016.01)

(52) U.S. Cl.
    CPC ................. *H02P 7/00* (2013.01); *H02P 6/20* (2013.01); *H02P 2203/03* (2013.01)

(58) Field of Classification Search
    CPC ....... G01D 5/12; G01D 5/34776; G01D 5/244
    See application file for complete search history.

(56) References Cited

U.S. PATENT DOCUMENTS

| | | | |
|---|---|---|---|
| 2003/0177649 A1* | 9/2003 | Ito ........................ | G01D 5/2492 33/1 PT |
| 2008/0165431 A1* | 7/2008 | Kokabu ................. | G02B 7/102 359/697 |
| 2014/0178058 A1* | 6/2014 | Sasaki .................... | G01D 5/244 396/87 |

\* cited by examiner

*Primary Examiner* — Huy Q Phan
*Assistant Examiner* — Zannatul Ferdous

(57) ABSTRACT

The present disclosure relates to a multi-turn angle controlling method based on an absolute position encoder, including: obtaining a target angle according to a starting position and a target position, and obtaining number of times N that the target angle passes a predetermined position, determining whether an absolute value of the target angle being greater than 360 degrees, conducting a first operation mode upon determining that the absolute value of the target angle being greater than 360 degrees, incrementing M by one when the operation angle passes the predetermined position until M equals to N, M is a positive integer and an initial value of M is zero, and conducting a second operation mode when M equals to N, N is a positive integer greater than 1.

8 Claims, 2 Drawing Sheets

MULTI-TURN ANGLE CONTROLLING METHOD BASED ON AN ABSOLUTE POSITION ENCODER AND DEVICE

CROSS REFERENCE TO RELATED APPLICATIONS

This application claims priority to Chinese Patent Application No. 201611266118.4, filed Dec. 31, 2016, which is hereby incorporated by reference herein in its entirety.

BACKGROUND

1. Technical Field

The present disclosure relates to multi-turns angle controlling field, more particularly to a multi-turn angle controlling method based on an absolute position encoder and a device.

2. Description of Related Art

Absolute position encoders have been widely adopted in angle measurement, length measurement, and positioning control. The absolute position encoders determine each unique position via the mechanical position, and may obtain the location information instantly without memorizing and locating reference points. Considering 12-bit sampling-accuracy as an example, the 12-bit absolute position encoder is divided by 4096 engraved lines around the code plate, i.e. the 12-bit absolute position encoders represent the circumference angle in a range from 0 to 4095. In the single-turn absolute position encoders, i.e. the concept is within one circle, the corresponding angle within 360 degrees is represented in the range from 0 to 4095. In the multi-turn absolute position encoders, i.e. the concept is within multiple circles, same sample value may represent different meanings. Such as, sample value 1024 (4095/4) may represent the position of 90 degrees, 360+90 degrees, and 720+90 degrees. Therefore, a problem may occur in adopting the sample value which is the sample value may not accurately represent the position to be controlled in the multi-turn absolute position encoders, such as 1024 may not represent 360+90 uniquely. Due to the absolute position encoders are cyclical cycle in the range from 0 to 4095, the sample value may not be a control reference directly with respect to the positioning control. Such as a sample value moves from a position 4000 to a position 100, and a difference between the starting position and the target position is −3900 (100−4000), while another sample value moves from the position 4000 to a position 4095, the difference between the starting position and the target position is 95 (4095−4000). In fact, the distance from the position 4000 to the position 100 is further than that from the position 4000 to the position 4095. The difference between the positions may not correspond to the actual operation distance. Therefore, the cyclical values bring inconvenience and complexity on logical processing with respect to the actual control.

DETAILED DESCRIPTION

To clarify the purpose, technical solutions, and the advantages of the disclosure, embodiments of the invention will now be described more fully hereinafter with reference to the accompanying drawings, in which embodiments of the invention are shown. The figure and the embodiment described according to figure are only for illustration, and the present disclosure is not limited to these embodiments.

Figure 1:
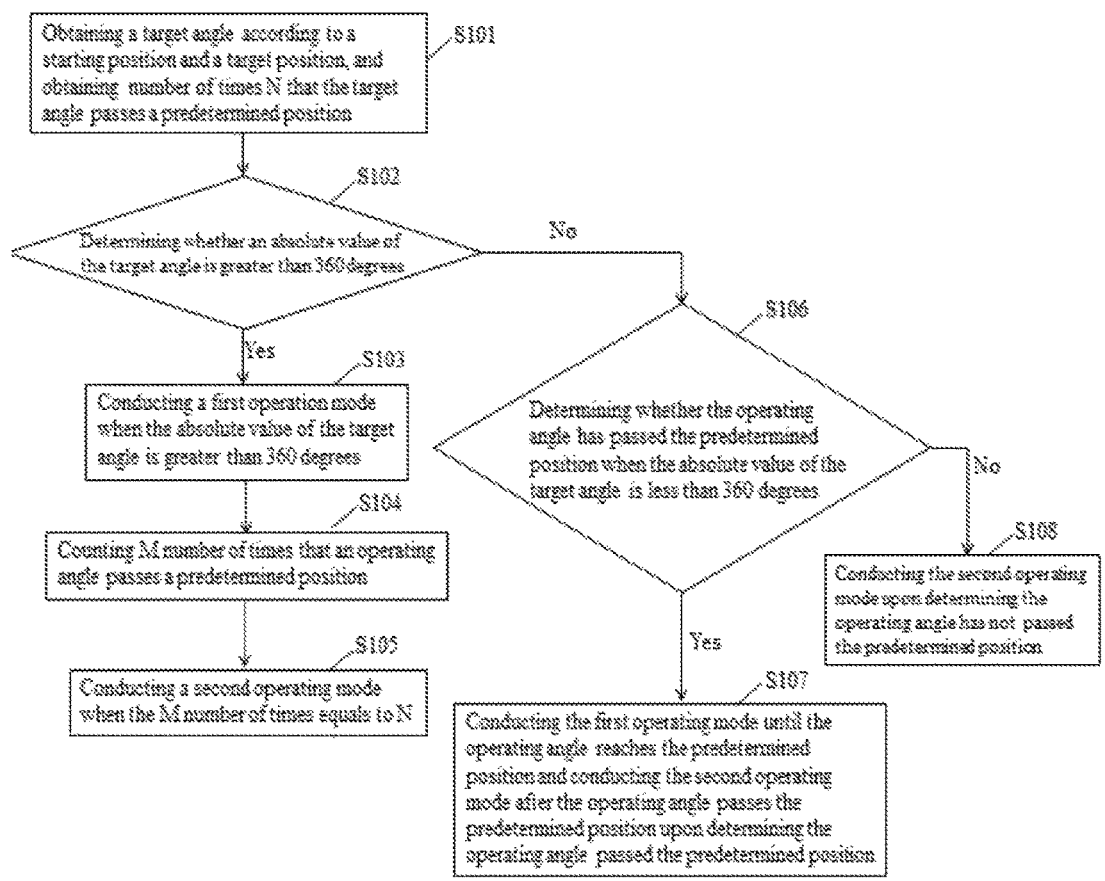
FIG. 1 is a flowchart of a multi-turn angle controlling method in accordance with one embodiment of the present disclosure.

FIG. 1 is a flowchart of a multi-turn angle controlling method based on an absolute position encoder 24 in accordance with one embodiment of the present disclosure, wherein the method includes steps as below:

In Step S101: obtaining a target angle according to a starting position and a target position, and obtaining number of times N that the target angle passes a predetermined position.

The absolute position encoder 24 is electronically connected to a motor 23. The starting position and the target position of the motor 23 are obtained by the absolute position encoder 24. Specifically, in one embodiment, the target angle to be operated by as motor 23 and an operation angle are obtained. The target angle is configured with a sign bit. A rotating direction may be determined when obtaining the target angle, wherein a positive sign bit represents a clockwise rotation, and a negative sign bit represents a counterclockwise rotation.

In Step S102: determining whether an absolute value of the target angle is greater than 360 degrees. If the absolute value of the target angle is greater than 360 degrees, the process goes to Step S103. If the absolute value of the target angle is not greater than 360 degrees, the process goes to step S106.

Specifically, after determining the rotating direction is clockwise or counterclockwise, determining whether the target angle is greater than one turn. Further, the target angle is divided by 360 degrees to determine whether a remainder equals to zero, and configuring different operation modes upon determining the remainder equals to zero.

In Step S103: conducting a first operation mode when the absolute value of the target angle is greater than 360 degrees.

Specifically, the first operation mode operates at an upper-limited speed, i.e., the first operation mode operates at the fastest constant speed. In one embodiment, the motor 23 operates at the fastest speed when M number of times that the operation angle passes a zero position is less than a predetermined number of times, i.e., N. In an example, the first operation mode may operate at another constant speed.

In Step S104: counting the M number of times that the operation angle passes a predetermined position. Wherein M is a positive integer and an initial value of M is zero. If M equals to N, the process goes to step S105. Otherwise, the process goes to step S104 again.

In an example, the predetermined position may be configured to be the zero position. In other examples, the predetermined position may also be configured to be another position.

In Step S105: conducting a second operation mode when the M number of times that the operation angle passes the predetermined position equals to N, wherein M and N are positive integers greater than 1.

The first operation mode is conducted when the absolute value of the target angle is greater than 360 degrees, and the M number of times is accumulated when the operation angle passes the zero position. The second operation mode is conducted when M equals to the predetermined number N.

The second operation mode dynamically adjusts the operation speed according to a difference between the target position and the starting position. In an example, the motor 23 is configured with a reasonable acceleration according to the difference when the M number of times that the operation angle passes the zero position equals to the predetermined number N. As such, the first operation mode and the second operation mode are combined together. The motor 23 accelerates gradually from the starting position, and starts to decelerate gradually when there is a certain distance between the motor 23 and the target position.

Specifically, the M number of times that the target angle passes the predetermined position are counted according to the absolute value of the target angle. The target angle is divided by 360 degrees to determine whether the remainder equals to zero. When the remainder equal to zero, the first operation mode is conducted until the operation angle has passed the starting position for M number of times and reaches the predetermined position, and the second operation mode is conducted upon the operation angle passes the predetermined position until the operation angle reaches the target position.

Different operation modes are conducted according to the target position and the different stages of the operation position, such that the programming logic may be simplified. The different operation modes are conducted with respect to the number of turns, as such, each position is configured with an unique operation mode so as to simplify the logical processing.

In Step S106: determining whether the target angle passes the predetermined position when the absolute value of the target angle is less than 360 degrees. The process goes to step S107 upon determining that the target angle has passed the predetermined position. The process goes to step S108 upon determining that the target angle has not passed the predetermined position.

In one embodiment, other operation modes may be configured when the absolute value of the target angle is less than 360 degrees.

Specifically, it the absolute value of the target angle is less than 360 degrees, it is determined that the rotation is less than one turn. Afterward, it is determined whether the target angle has passed the predetermined position. Different operation modes are configured in accordance with the determination it whether the target angle has passed the predetermined position.

In Step S107: conducting the first operation mode upon determining the operation angle has passed the predetermined position, and conducting the second operation mode until the operation angle reaches the predetermined position.

Specifically, in one embodiment, when the operation angle passes the predetermined position and reaches the target angle, the first operation mode is conducted from the starting position until the operation angle passes the predetermined position, and the second operation mode is conducted upon the operation angle passes the predetermined position until the operation angle reaches the target position. For convenience of counting and controlling, the predetermined position may be configured to be the zero position.

Different operation modes are configured according to the target position and the different stages of the operation position, and different operation modes are configured alter the operation angle passes the predetermined position. The configured operation angle and the corresponding logic programming of the operation mode within the motor may be simplified, so as to enhance the control.

In Step S108: the second operation mode is conducted upon determining that the operation angle has not passed the predetermined position.

In one example, other operation modes may also be operated upon determining that the operation angle has not passed the predetermined position.

Specifically, upon determining the target angle has not passed the predetermined position, the position of the operation angle is a unique value. Therefore, the second operation mode may be conducted directly.

Different operation modes are configured with respect to the number of turns, wherein the target angle is divided by 360 degrees to determine whether the remainder equals to zero, and the determination regarding whether the target angle has passed the predetermined position according to the operation distance of the motor from the starting position until the operation angle reaches the target position. The operation angle, the target position, and the operation mode are unique, so as to simplify programming logic and to reduce the probability of BUG occurring in coding.

Figure 2:
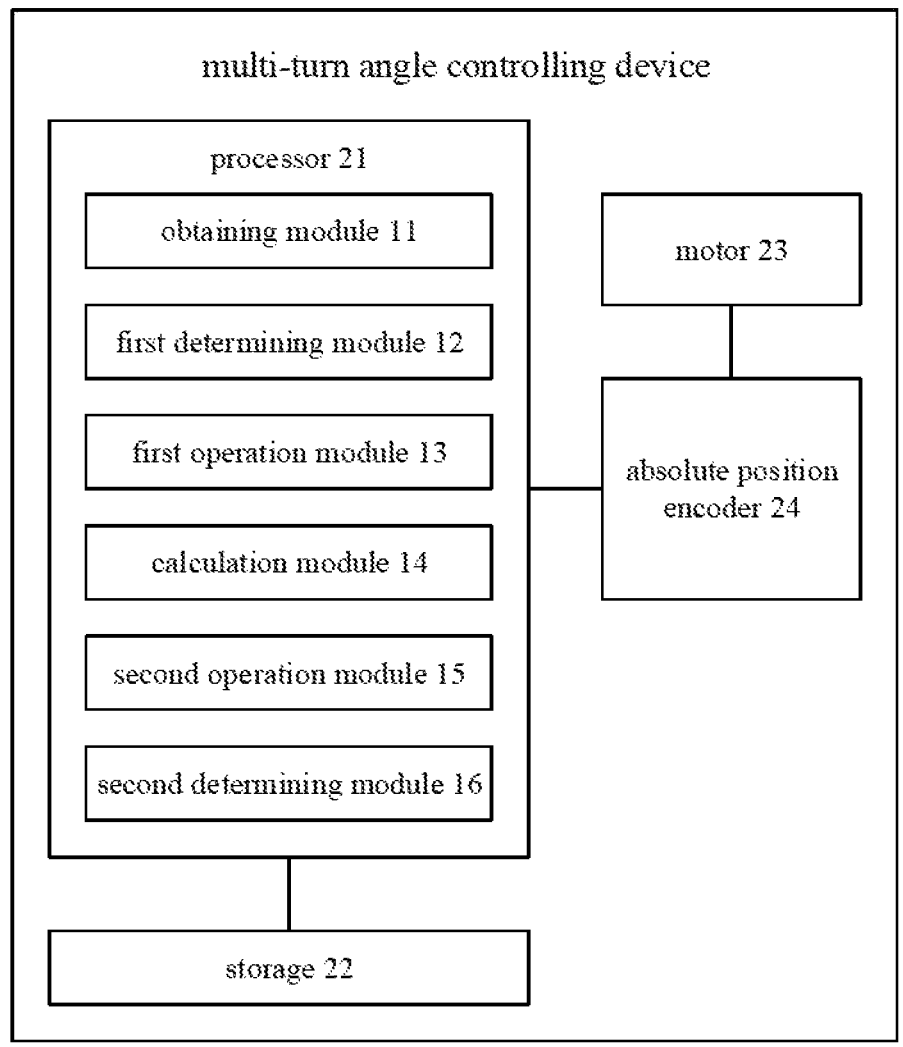
FIG. 2 is a schematic view of a multi-turn angle controlling device in accordance with one embodiment of the present disclosure.

In another aspect, the present disclosure further relates to a multi-turn angle controlling device, as shown in FIG. 2, the device includes: an obtaining module 11, a first determining module 12, a first operation module 13, a calculation module 14, and a second operation module 15.

The obtaining module 11 is configured to obtain the target angle according to the starting position and the target position, and obtaining number of times N that the target angle passes the predetermined position. The first determining module 12 is configured to determine whether the absolute value of the target angle is greater than 360 degrees. The calculation module 14 is configured to count the M number of times that the operation angle passes the predetermined position. Wherein M is a positive integer and an initial value of M is zero. When the target angle is greater than 360 degrees, the first operation module 13 is configured to conduct the first operation mode as M is less than N. The second operation module 15 is configured to conduct the second operation mode as the M equals to N, herein M and N are positive integers greater than 1.

The device further includes a second determining module 16 configured to determine whether the operation angle has passed the predetermined position when the absolute value of the target angle is less than 360 degrees.

The first operation module 13 configured to conduct the first operation mode until the operation angle reaches the predetermined position upon determining that the operation angle has passed the predetermined position. The second operation module 15 configured to conduct the second operation mode upon the operation angle passes the predetermined position.

The second operation module 15 further configured to conduct the second operation mode upon determining that the operation angle had not passed the predetermined position.

The first operation mode operates at the upper-limited speed, and the second operation mode dynamically adjusts the operation speed according to the difference between the target position and the starting position.

The device and the multi-turn angle controlling method based on the absolute position encoder 24 are two aspects based on a same conception. The detail of the method has been fully described, so that the person skilled in the art may understand the structure of device and process of the method in the present disclosure. In order to simplify the description, the detail may not be repeated again.

For the convenience of description, the above device is described in terms of various modules with respect to different functions. In another example, each of the functionality of the modules may be implemented in the one or more software and/or hardware.

In view of the embodiments described above, persons skilled in the art can conceive that the present application may be implemented by software together with hardware platform. Based on such understanding, the technical features of the present disclosure and the contribution to the prior are may be embodied in the form of software product. The software product may be stored in a storage medium, such as ROM/RAM, disk, CD-ROM, including a plurality of instructions that can be executed by a computer device, which may be a personal computer, a server, or a network equipment, so as to execute the method or the various embodiments of the present disclosure.

The present discloses further relates multi-turn angle controlling device based on an absolute position encoder 24, as shown in FIG. 2, including: a processor 21, a storage 22 configured to store instructions, a motor 23 and an absolute position encoder 24 electronically connected to the motor 23,wherein the instructions are executable by the processor. The absolute position encoder 24 is configured to obtain a starting position and a target position of the motor 23.

Wherein the processor 21 is configured to obtain the target angle according to the starting position and the target position, and obtaining number of times N that the target angle passes the predetermined position, to determine whether the absolute value of the target angle is greater than 360 degrees, to conduct the first operation mode upon determining that the absolute value of the target angle being greater than 360 degrees. Incrementing M by one when the operation angle passes the predetermined value until M equals to N, wherein M is a positive integer and an initial value of M is zero, and to conduct the second operation mode when M equals to N, wherein N is a positive integer greater than 1.

After determining whether the absolute value of the target angle is greater than 360 degrees, the processor is further configured to determine whether the operation angle has passed the predetermined position when the absolute value of the target angle is less than 360 degrees, to conduct the first operation mode until the operation angle passes the predetermined position and to conduct the conducting the second operation mode after the operation angle passes the predetermined position upon determining that the operation angle has passed the predetermined position, to conduct the second operation mode upon determining that the operation angle has not passed the predetermined position.

The first operation mode operates at the upper-limited speed.

The second operation mode dynamically adjusts the operation speed according to the difference between the target position and the starting position.

The device and the multi-turn angle controlling method based on the absolute position encoder 24 are two aspects based on a same conception. The detail of the method has been fully described, so that the person skilled in the art may understand the structure of device and process of the method in the present disclosure. In order to simplify the description, the detail may not be repeated again.

The present disclosure relates the multi-turn angle controlling method and the device configuring different operation modes with respect to the number of turns, wherein the target angle is divided by 360 degrees to determine whether the remainder equals to zero, and the determination regarding whether the target angle has passed the predetermined position according to the operation distance of the motor from the starting position until the operation angle reaches the target position. The operation angle, target position, and the operation mode are unique, so as to simplify programming logic and to reduce the probability of BUG occurring in coding.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A multi-turn angle controlling method based on an absolute position encoder electronically connected to a motor, comprising:
   obtaining a starting position and a target position of the motor by the absolute position encoder;
   obtaining a target angle according to the starting position and the target position, and obtaining number of times N that the target angle passes a predetermined position;
   determining whether an absolute value of the target angle being greater than 360 degrees;
   turning the motor under control of the absolute position encoder such that the motor operates in a first operation mode if the absolute value of the target angle is greater than 360 degrees, wherein the first operation mode turns the motor at an upper-limited speed;
   M is a positive integer and an initial value of M is zero, and incrementing M by one when the operation angle passes the predetermined position until M equals to N;
   turning the motor under control of the absolute position encoder such that the motor operates in a second operation mode when M equals to N, wherein N is a positive integer greater than 1, wherein the second operation mode dynamically adjusts an operation speed of the motor according to a difference between the target position and the starting position.

2. The multi-turn angle controlling method according to claim 1, wherein after the determining step, the method further comprises:
   determining whether the operation angle passes the predetermined position when the absolute value of the target angle is less than 360 degrees;
   turning the motor under control of the absolute position encoder such that the motor operates in the first operation mode until the operation angle reaches the predetermined position and turning the motor under control of the absolute position encoder such that the motor operates in the second operation mode after the operation angle passes the predetermined position.

3. The multi-turn angle controlling method according to claim 2, wherein after the step of determining whether the operation angle passes the predetermined position when the absolute value of the target angle is less than 360 degrees, the method further comprises:
   turning the motor under control of the absolute position encoder such that the motor operates in the second operation mode upon determining that the operation angle has not passed the predetermined position.

4. A multi-turn angle-controlling device, the device comprising:
   one or more processor;
   a motor;
   an absolute position encoder electronically connected to the motor;
   memory; and
   one or more programs, wherein the one or more programs are stored in the memory and configured to be executed by the one or more processors, the one or more programs controlling the multi-turn angle-controlling device to:

obtain a starting position and a target position of the motor by the absolute position encoder;

obtain a target angle according to the starting position and the target position, and obtain number of times N that the target angle passes a predetermined position;

determine whether an absolute value of the target angle being greater than 360 degrees;

turn the motor under control of the absolute position encoder such that the motor operates in a first operation mode if the absolute value of the target angle is greater than 360 degrees, wherein the first operation mode turns the motor at an upper-limited speed;

increment M by one when the operation angle passes the predetermined value until M equals to N, wherein M is a positive integer and an initial value of M is zero;

turn the motor under control of the absolute position encoder such that the motor operates in a second operation mode when M equals to N, wherein N is a positive integer greater than 1, wherein the second operation mode dynamically adjusts an operation speed of the motor according to a difference between the target position and the starting position.

5. The multi-turn angle controlling device according to claim 4, wherein the one or more programs controlling the multi-turn angle-controlling device to:

determine whether the operation angle passing the predetermined position when the absolute value of the target angle being less than 360 degrees;

turn the motor under control of the absolute position encoder such that the motor operates in the first operation mode until the operation angle reaching the predetermined position upon determining that the operation angle has passed the predetermined position;

turn the motor under control of the absolute position encoder such that the motor operates in the second operation mode after the operation angle reaching the predetermined position upon determining that the operation angle has passed the predetermined position.

6. The multi-turn angle controlling device according to claim 5, wherein the one or more programs controlling the multi-turn angle-controlling device to:

turn the motor under control of the absolute position encoder such that the motor operates in the second operation mode upon determining that the operation angle has not passed the predetermined position.

7. The multi-turn angle controlling method according to claim 1, wherein the predetermined position is configured to a zero position.

8. The multi-turn angle controlling device according to claim 4, wherein the predetermined position is configured to a zero position.

* * * * *